United States Patent
Yerli

(10) Patent No.: US 12,361,338 B2
(45) Date of Patent: *Jul. 15, 2025

(54) SERVICE MANAGEMENT METHOD AND SYSTEM

(71) Applicant: TMRW Group IP, Luxembourg (LU)

(72) Inventor: Cevat Yerli, Dubai (AE)

(73) Assignee: TMRW Group IP, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,606

(22) Filed: May 15, 2023

(65) Prior Publication Data

US 2023/0401495 A1    Dec. 14, 2023

Related U.S. Application Data

(63) Continuation of application No. 15/008,007, filed on Jan. 27, 2016, now Pat. No. 11,663,530.

(51) Int. Cl.
*G06Q 10/02* (2012.01)
*H04L 67/51* (2022.01)
*H04L 67/52* (2022.01)
*H04L 67/306* (2022.01)

(52) U.S. Cl.
CPC ............. *G06Q 10/02* (2013.01); *H04L 67/51* (2022.05); *H04L 67/52* (2022.05); *H04L 67/306* (2013.01)

(58) Field of Classification Search
CPC ................................ G06Q 10/02; G06Q 50/30
See application file for complete search history.

(56) References Cited

U.S. PATENT DOCUMENTS

| | | |
|---|---|---|
| 9,945,680 B1 | 4/2018 | Kahn et al. |
| 10,062,132 B2 * | 8/2018 | Eramian ................ G06Q 10/02 |
| 2007/0032240 A1 | 2/2007 | Finnegan et al. |
| 2010/0015993 A1 * | 1/2010 | Dingler .................. H04L 67/52 |
| | | 455/456.1 |
| 2012/0095791 A1 | 4/2012 | Stefik et al. |

(Continued)

FOREIGN PATENT DOCUMENTS

CA    2775804 C  *  1/2013   ............. G06Q 10/02

OTHER PUBLICATIONS

Bauer et al., SmartPager—An Interactive System for Restaurant-Customer Interactions, University of Tennessee, Knoxville, May 2013 (Year: 2013).*

*Primary Examiner* — Rupangini Singh
(74) *Attorney, Agent, or Firm* — BRYAN CAVE LEIGHTON PAISNER LLP

(57) ABSTRACT

A computer-implemented method for managing services is disclosed, which comprises providing to a service provider a notification of a service reservation by one or more customer entities, continuously estimating a time of arrival based on a current geolocation of the one or more customer entities, providing to the service provider an indication of the estimated time of arrival, notifying the service provider of an arrival of the one or more customer entities at the location of the service provider based on the current geolocation and the location of the service provider, and responsive to the arrival at the location of the service provider, automatically coupling the one or more customer entities to a communication network of the service provider to confirm the service reservation.

18 Claims, 5 Drawing Sheets

(56) References Cited

U.S. PATENT DOCUMENTS

| | | | |
|---|---|---|---|
| 2012/0197670 A1* | 8/2012 | Poon | G06Q 10/02 |
| | | | 705/5 |
| 2013/0090959 A1 | 4/2013 | Kvamme et al. | |
| 2013/0144660 A1 | 6/2013 | Martin | |
| 2013/0285855 A1* | 10/2013 | Dupray | H04W 4/021 |
| | | | 342/451 |
| 2013/0347073 A1* | 12/2013 | Bryksa | H04L 63/083 |
| | | | 726/4 |
| 2014/0279270 A1 | 9/2014 | Bertanzetti et al. | |
| 2014/0379390 A1* | 12/2014 | Scarborough | G06Q 30/0639 |
| | | | 705/5 |
| 2016/0155088 A1* | 6/2016 | Pylappan | G06Q 10/0836 |
| | | | 705/333 |
| 2016/0232515 A1 | 8/2016 | Jhas et al. | |

* cited by examiner

SERVICE MANAGEMENT METHOD AND SYSTEM

TECHNICAL FIELD

The present disclosure relates to a method and a network system for managing services, particularly for service reservation. Furthermore, the disclosure relates to a computing device and a service provider device.

BACKGROUND

Currently available service reservation techniques, including those enabling service reservation via electronic devices, such as smart devices, laptops, tablets, etc., are limited to reserving a service per se at a particular location indicating a particular time. All post-reservation activities of customers and service providers are autonomous and customers are not supposed to further interact with the service provider after receipt of the service reservation.

Furthermore, a modification of service reservations is not always supported and possible using such electronic devices, but requires a personal intervention of the customer, such as via phone calls or personal presence. If customers are late or decide not to come to a location of the service provider, the service provider may find this out only through a phone call and often at a very last moment. The service provider then has to hold reservations until the very last moment refusing other customers. Otherwise, a service provider may mistakenly cancel reservations if customers are late and cannot subsequently provide services to the late customers, which may lead to unhappy customers and bad feedback for service providers. These situations may arise, for example, with table reservations in restaurants.

On the other hand, it may happen that customers have to wait for a long time after coming to a restaurant or bar before their orders are ready. If customers in a group arrive at different times, providing the service usually becomes more difficult and delays in service may increase. For service providers, such as restaurants, these situations can lead to extra stress for the staff and unhappy customers, which can all be very damaging and costly to a restaurant's profitability and reputation.

In view of the above, one object is to enable a fully supporting and comprehensive management of services.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The above described technical problems are solved by a computer-implemented method for managing services and a networked system for managing services as defined in the independent claims. Furthermore, a computing device for managing services and a service provider device are defined.

A first aspect of the present disclosure provides a computer-implemented method for managing services, comprising providing to a service provider a notification of a service reservation by one or more customer entities, continuously estimating a time of arrival based on a current geolocation of the one or more customer entities, providing to the service provider an indication of the estimated time of arrival, notifying the service provider of an arrival of the one or more customer entities at the location of the service provider based on the current geolocation and the location of the service provider, and responsive to the arrival at the location of the service provider, automatically coupling the one or more customer entities to a communication network of the service provider to confirm the service reservation.

The method may be implemented on a server device, which may be implemented on at least one hardware device, such as one or more computer devices. The server device may be a central server device, a server device in a cloud or a server device of an online service, such as a social network.

The term customer entity may be used throughout this description to refer to an electronic device operated by a customer, client or user. However, the term customer entity may also directly refer to the customer, client or user operating a corresponding electronic device. Each customer entity may be or may refer to an electronic device, such as a smartphone, a tablet, a mobile phone, a laptop, etc., that may enable a reservation of goods or services provided by the service provider. For example, a customer entity may order a meal in a restaurant. Individual customer entities of a plurality of customer entities may operate an individual electronic device to jointly order, reserve or book goods or services, for example, in order to enable a group ordering in a social network or to simplify ordering of a group of customers in a restaurant directed at a single order. Each of the one or more customer entities may be implemented on at least one hardware device.

Each one of the one or more customer entities may submit an individual notification of service reservation to reserve services or goods, which may be associated with the respective customer entity. At least one of the one or more customer entities may be defined as a host customer entity and the one or more services or goods reserved may be associated with the host customer entity. Other customer entities may provide further notifications of service reservations that may be associated with the host customer entity. Responsive to a confirmation of the service reservation, each individual customer entity may update the associated goods or services.

The term service provider may be used throughout this description as referring to a service provider entity or at least one service provider device. Each service provider device may be implemented on a hardware device.

Responsive to the service reservation, the geolocation of the one or more customer entities, such as the host customer entity, is requested, for example, by tracking the customer entity or pulling respective geolocation data. The data may further be used to calculate and provide navigations directions to the one or more customer entities by the server device. The data further serves the purpose of estimating a time of arrival, which may be automatically provided to the service provider. The estimated time of arrival may be based on a current distance to the location of the service provider. The distance may be a direct geometrical distance or a distance determined via said navigation directions, which may represent a current walking or driving distance. The current geolocation may also be used to continuously evaluate whether the customer entity has arrived at the location of the service provider.

Responsive to the arrival at the location, the customer entities are automatically coupled to the communication network of the service provider. The coupling may be fully automatic and does not require any interaction of the customer entity, such as providing a password or other authentication of the customer entity at the communication network. Rather, based on the received service reservation, current geolocation, estimated time of arrival and/or detection of arrival of the customer entity, the communication network may be automatically set up to accept a connect request of the customer entity and bind the customer entity to the communication network. The communication network may provide access to an IP-based network, such as the Internet. However, since the communication network has information on the customer entity, any data traffic from and to the customer entity may be authenticated, authorized and/or verified. For example, any further service reservations by a coupled customer entity via the communication network of the service provider need not to be further authorized, such as by providing a password or any other form of authentication.

Accordingly, the present disclosure provides an effective process of managing services, including services reservations and continuously updating service providers regarding reservations made, which is based on dynamical interaction between customer entities and service providers. Furthermore, by providing an estimated time of arrival and determining the arrival, the service provider may be notified about a current state of the customer entity in order to verify the service reservation at any time. This provides for a higher level of reliability for the service provider. The coupling of customer entities to the communication network of the service provider enables a simplified communication of the customer entities, simplified authentication of the customer entities and a reliable confirmation of reservations.

Preferably, the method may be directed at making reservations in restaurants, which may allow timely updating of restaurant staff on an amount of guests, i.e., customer entities, their time of arrival, order requirements and dishes ready for collection from the kitchen. At the same time restaurant management would better be able to manage a restaurant profile, menus, daily offers, ordering, and staff accounts and obtain accurate statistics, reports, etc., regarding the running of the restaurant. The method will further enable customers to optimize their plans using estimated time of arrival to the location of the restaurant and make additional orders or amend existing reservations while on the way to the restaurant or upon arrival. However, it is to be understood that embodiments are not restricted to an application in restaurants only, but may generally encompass any reservation of goods and services, such as any ordering and/or booking processing directed at providing services or goods to customers by service providers, such as hotel spas, beauty services, laundries, dress-making and tailoring providers, etc. Embodiments may also encompass order processing for goods where customers pre-order goods and schedule a time to pick them up.

According to one embodiment, the method further comprises continuously requesting a current geolocation of the one or more customer entities. The server is not required to wait until receipt of a current geolocation from the one or more customer entities, but may set up time intervals for requesting the current geolocation. This increases the accuracy of estimating the time of arrival and predictability of arrival of the customer entities at the location of the service provider. Furthermore, any changes in the estimated time of arrival may be monitored in order to verify that the customer entity is traveling to the location of the service provider and not departing therefrom. The method may make the request of the current geolocation visible to the customer entities and may further enable the customer entities to check and manually adjust the current geolocation before sending it to the service provider. Even though the current geolocation is tracked by the server, the service provider may not be provided with this data. Rather, only the estimated time of arrival may be notified to the service provider. This increases the level of privacy for the individual customer entities while providing the service provider with sufficient information to verify or estimate reliability of the reservation.

In yet another embodiment, continuously requesting the current geolocation of the one or more customer entities is triggered manually by the service provider, or at least one of the one or more customer entities. In case the service provider or the customer entities do not receive information on the geolocation and the time of arrival for a considerable amount of time, for example, due to software or connection errors, they may manually trigger requesting the current geolocation via the server to proceed with the service managing, in accordance with one or more embodiments of the present disclosure.

According to yet another embodiment, continuously requesting the current geolocation of the one or more customer entities is triggered automatically in response to determining that at least one of the one or more customer entities is at a predetermined distance away from the location of the service provider. In addition or as an alternative, the current geolocation of the one or more customer entities may be automatically triggered in response to determining that a predetermined time is left before a reservation time. The predetermined distance and/or time may be set by the service provider, the server device or any of the one or more customer entities. Preferably, the predetermined distance and the predetermined time may be considered simultaneously as a prerequisite to triggering of the current geolocation.

In yet another embodiment, requesting the current geolocation of the one or more customer entities is performed in predetermined time intervals. The time intervals may be predetermined by the service provider, the server device or any of the one or more customer entities. The duration of the time intervals may influence a metric of reliability of the reservation.

In yet another embodiment, requesting the current geolocation comprises polling of the one or more customer entities. At least some customer entities may provide an interface for pulling of geolocation data. The customer entity may be set up to allow the server to access the interface and to pull the data.

In yet another embodiment, the service provider is notified of the arrival of the one or more customer entities at the location of the service provider when the distance between the current geolocation and the location of the service provider is less than a predetermined threshold. The threshold may be set by the service provider, the server device or any of the one or more customer entities.

In yet another embodiment, coupling the one or more customer entities to the communication network of the service provider includes providing access of the one or more customer entities to the communication network of the service provider. After the access to the communication network is provided, the customer entities may receive data on a current status of the reservation and/or may further receive information on an estimated time of arrival of other customer entities, which may be linked to form a group of customer entities that are associated with the reservation.

In yet another embodiment, coupling the one or more customer entities to the communication network of the service provider includes performing a data exchange between the one or more customer entities and the service provider. The data exchange may enable the customer entities to amend any reservations that have been made.

In yet another embodiment, the method further comprises adjusting the service reservation based on information provided by the one or more customer entities. The information may include preferences of the customer, a state of health, previous reservations, or a current geolocation of the customer entity in any combination. At least some of the information may also be automatically retrieved from a user's profile of an online service, such as a social network.

In yet another embodiment, the method further comprises providing one or more devices associated with the service provider with the estimated time of arrival and with the notification of the arrival of the one or more customer entities at the location of the service provider. The one or more devices may be used by the service provider to initiate provision of the services and/or goods according to the service reservation. For example, the services and/or goods may be provided by several processing entities of the service provider, which may each operate at least one of the one or more devices, and which may be assigned with individual processing tasks in order to deliver the services and/or goods to the customer entities. This further simplifies coordination of work at the service provider.

In yet another embodiment, the method further comprises assigning one or more additional customer entities to the service reservation by the one or more customer entities. The one or more customer entities assigning the one or more additional customer entities may be recognized as host customer entities and have broader access to the data provided by the service provider, such as billing information, in comparison with the one or more additional customer entities which may be recognized as guest customer entities.

In yet another embodiment, the service reservation is enabled using a mobile application or via a website. The customer entity may be a mobile device executing the mobile application or providing means to access the website. The mobile device may have means for providing the geolocation of the mobile device.

In yet another embodiment, the method further comprises performing a payment process in response to a request of at least one of the one or more customer entities. The payment process may be performed for all customer entities or only some customer entities. The payment process may be further performed via a mobile application or via a terminal placed at the location of the service provider. The payment process may be further performed via the communication network of the service provider, such that customer entities coupled to the communication network may automatically trigger the payment process. Furthermore, the payment process may be automatically finalized in response to the customer entity leaving the communication network of the service provider.

In yet another embodiment, the method further comprises providing preliminary bill information to the one or more customer entities.

In one embodiment, the service provider is a restaurant.

According to another aspect of the present disclosure, a computing device for managing services is provided, comprising a server device connected to a service provider and one or more customer entities via a communication network. The server device is configured to provide to the service provider a notification of a service reservation by the one or more customer entities, continuously estimate a time of arrival based on a current geolocation of the one or more customer entities, provide to the service provider an indication of the estimated time of arrival, notify the service provider of an arrival of the one or more customer entities at the location of the service provider based on the current geolocation and the location of the service provider, and responsive to the arrival at the location of the service provider, automatically couple the one or more customer entities to a communication network of the service provider to confirm the service reservation.

Preferably, the server device may be configured to perform a method according to embodiments of the present disclosure in any combination.

According to another aspect of the present disclosure, a service provider device for managing services is connected to a server device and to one or more customer entities via a communication network. The server provider device is configured to receive a notification of a service reservation by the one or more customer entities, continuously receive an indication of the estimated time of arrival estimated based on a current geolocation of the one or more customer entities, receive a notification of an arrival of the one or more customer entities at the location of the service provider device based on the current geolocation of the one or more customer entities and the location of the service provider device, and responsive to the arrival of the one or more customer entities at the location of the service provider device, automatically couple the one or more customer entities to a communication network of the service provider device to confirm the service reservation.

According to a further aspect of the present disclosure, a networked system for managing services is provided, the networked system comprising: a communication network including hardware infrastructure; a server device connected to the communication network; a service provider connected to the server device via the communication network; and one or more customer entities connected to the server device via the communication network; wherein the server device is configured to: provide to the service provider a notification of a service reservation by the one or more customer entities; continuously estimate a time of arrival based on a current geolocation of the one or more customer entities; provide to the service provider an indication of the estimated time of arrival; notify the service provider of an arrival of the one or more customer entities at the location of the service provider based on the current geolocation and the location of the service provider; and responsive to the arrival at the location of the service provider, automatically couple the one or more customer entities to a communication network of the service provider to confirm the service reservation.

In one embodiment the server device is further configured to continuously request a current geolocation of the one or more customer entities.

In yet another embodiment, continuously requesting the current geolocation of the one or more customer entities by the server device is triggered manually by the service provider or at least one of the one or more customer entities.

In yet another embodiment, continuously requesting the current geolocation of the one or more customer entities by the server device is triggered automatically in response to determining that at least one of the one or more customer entities is at a predetermined distance away from the location of the service provider or a predetermined time is left before a reservation time.

In yet another embodiment, the server device is further configured to request the current geolocation of the one or more customer entities in predetermined time intervals.

In yet another embodiment, requesting the current geolocation comprises polling of the one or more customer entities.

According to yet another embodiment, the server device is further configured to notify the service provider of the arrival of the one or more customer entities at the location of the service provider when the distance between the current geolocation and the location of the service provider is less than a predetermined threshold.

According to yet another embodiment, coupling the one or more customer entities to the communication network of the service provider by the server device includes providing access of the one or more customer entities to the communication network of the service provider.

In yet another embodiment, coupling the one or more customer entities to a communication network of the service provider by the server device includes performing a data exchange between the one or more customer entities and the service provider.

In yet another embodiment, the server device is further configured to adjust the service reservation based on information provided by the one or more customer entities including at least one of: the customers' preferences, the customers' state of health, the customers' previous reservations, and the current geolocation of the customers.

In yet another embodiment, the server device is further configured to provide one or more devices associated with the service provider with the estimated time of arrival and with the notification of an arrival of the one or more customer entities at the location of the service provider.

In yet another embodiment, the server device is further configured to assign one or more additional customer entities to the service reservation by the one or more customer entities.

In yet another embodiment, the service reservation is enabled using a mobile application or via a website.

In yet another embodiment, the server device is further configured to perform a payment process in response to a request of at least one of the one or more customer entities.

In yet another embodiment, the server device is further configured to provide preliminary bill information to the one or more customer entities.

In yet another embodiment of the networked system, the service provider is a restaurant.

Preferably, the server device, the service provider and the one or more customer entities may comprise hardware or may be implemented in hardware or on a hardware device, such as on a computing device or electronic device, for example, a personal computer, a laptop, a tablet, a smart device, etc.

According to yet another aspect of the present disclosure, a computer-readable medium having instructions stored thereon is provided, wherein said instructions, in response to execution by a computing device, cause said computing device to automatically perform a method according to embodiments of the present disclosure. In particular, said computing device may correspond to a service provider (device), a server device and/or a customer entity (device) according to embodiments of the present disclosure, in any combination.

Furthermore, embodiments according to the method for managing services and/or embodiments of the networked system for managing services and/or embodiments of the computing device and/or embodiments of the service provider device may be combined. For example, the service provider, the server entity or the one or more customer entities of the networked system according to one or more embodiments may be configured to perform the method or individual method steps of the method for managing services according to one or more embodiments of the present disclosure. Furthermore, embodiments of the method for managing services may include processing steps directed at functionality of the components of the networked system according to one or more embodiments of the present disclosure in any combination.

DESCRIPTION OF THE DRAWINGS

The specific features, aspects and advantages of the present disclosure will be better understood with regard to the following description and accompanying drawings where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
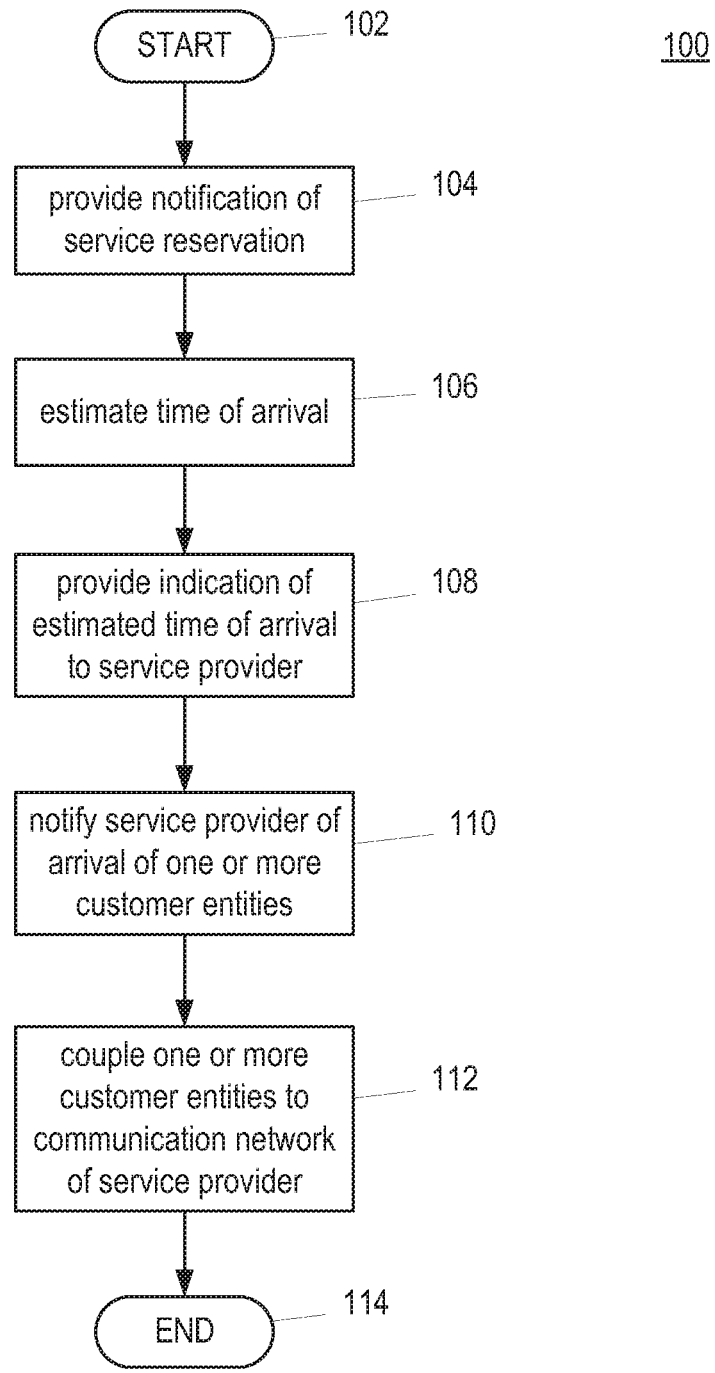
FIG. 1 shows a flow chart of a method for managing services according to an embodiments of the present disclosure.

FIG. 1 shows a flow chart of a method for managing services. The method 100 may be performed on a networked computer and may start in item 102.

The method 100 may proceed with item 104, wherein a notification of a service reservation by one or more customer entities is provided to a service provider. A service reservation may be made using a mobile application or via a website of the service provider. The customer entity may further update the service reservation. In this case an updated reservation notification is provided by the one or more customer entities to the service provider.

The method 100 may proceed with item 106 by estimating a time of arrival based on a current geolocation of the one or more customer entities. The time of arrival may be estimated in certain time intervals predetermined by the service provider, the one or more customer entities or the server device. In item 108, an indication of the estimated time of arrival may be provided to the service provider. In case of continuously estimating the time of arrival, the service provider may be provided with an updated time of arrival in certain time intervals.

In item 110, the service provider may be notified of an arrival of the one or more customer entities at the location of the service provider based on the current geolocation and the location of the service provider. Then, responsive to the arrival at the location of the service provider, the one or more customer entities may automatically couple to a communication network of the service provider in item 112 to confirm the service reservation. The method may then end in item 114.

In item 112, the service reservation may be confirmed upon arrival of only one of the customer entities and/or a specific customer entity at the location of the service provider, which has submitted the service reservation. The service reservation may be also confirmed upon arrival of several random or specified customer entities or all customer entities which are notified of the reservation.

Figure 2:
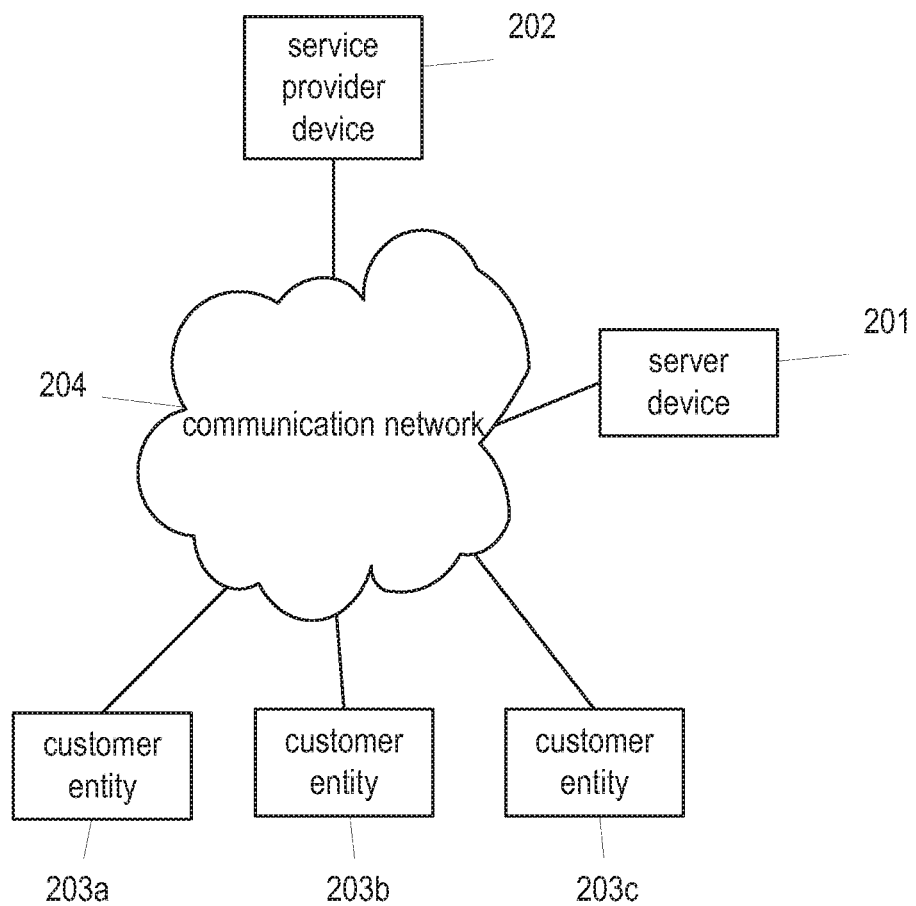
FIG. 2 shows a schematic system overview according to one embodiment.

FIG. 2 shows an infrastructure of a networked environment according to one embodiment of the present disclosure. The infrastructure 200 may comprise a server device 201. The server device may be configured to perform a method for management of services, such as the method 100 of FIG. 1. The server device 201 may be connected to a service provider device 202 and one or more customer devices (customer entities) 203a, 203b, 203c via a communication network 204. It is to be understood that even though only three customer devices are shown, the embodiments are not restricted to a particular number of customer devices and may, rather, enable use of any number of customer devices (customer entities).

Figure 3A:
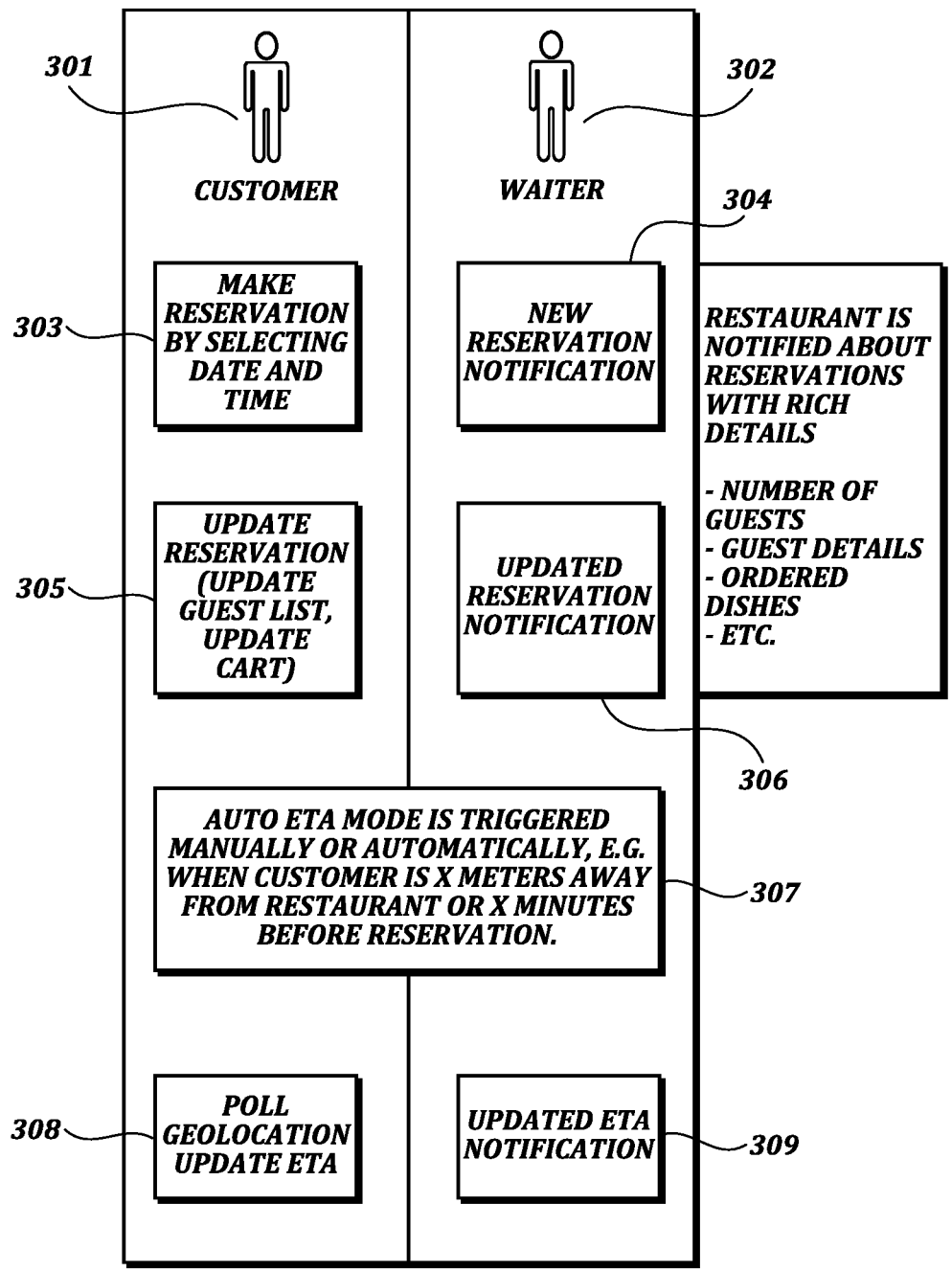
FIGS. 3A, 3B, and 3C show another schematic overview of a system according to one embodiment of the present disclosure.
Figure 3B:
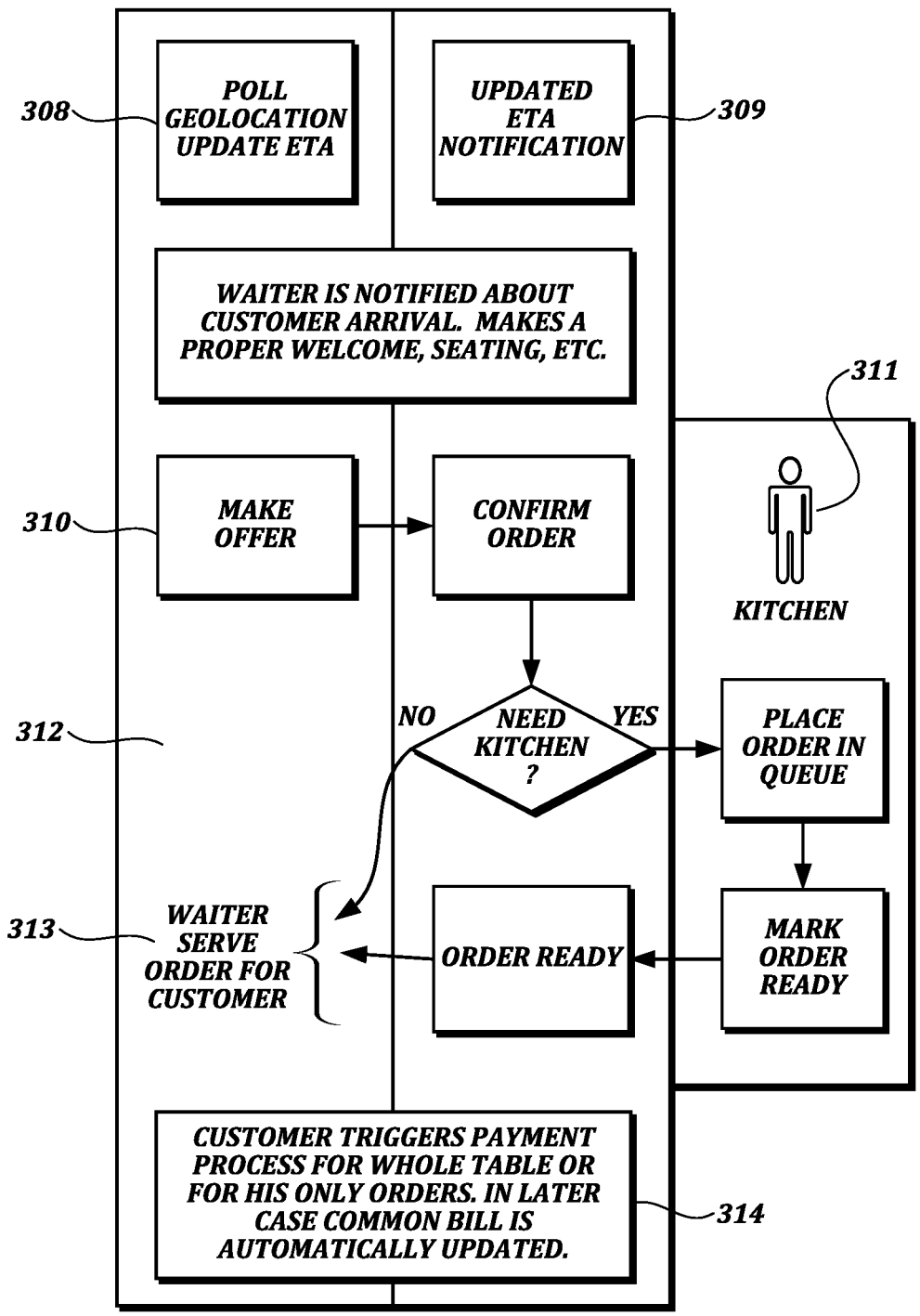
Figure 3C:
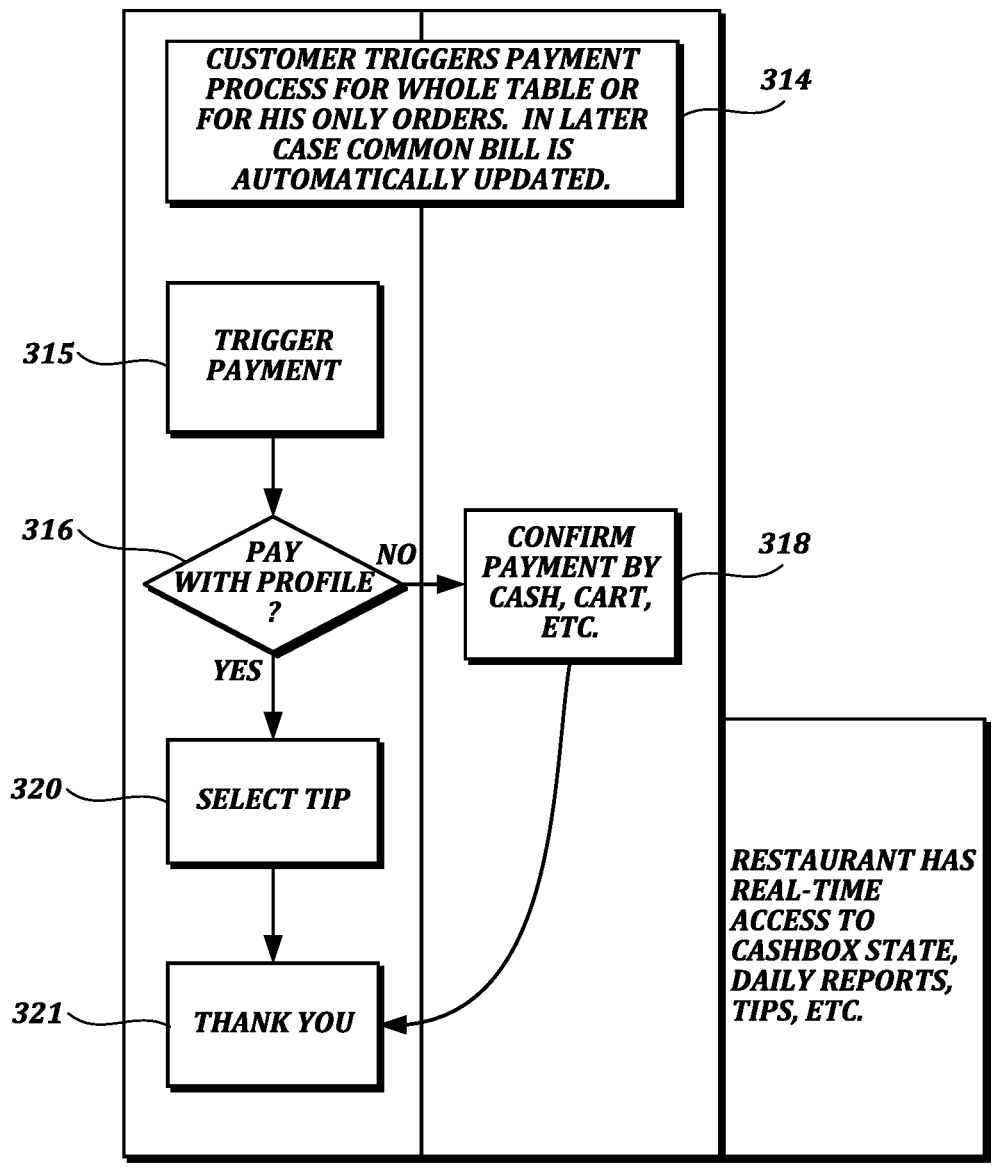

FIGS. 3A to 3C show an example service management system outline based on one or more embodiments of the present disclosure, wherein the service provider is a restaurant.

As shown in FIG. 3A, a customer 301 may interact with a waiter 302 of a restaurant. Both the customer 301 and the waiter 302 may use electronic devices, such as smartphones, laptops, electronic terminals, tablets, etc., in order to make a reservation and/or receive a new reservation notification. The customer 301 may make a reservation by selecting a date and a time, in item 303. The notification of the respective reservation may be automatically received by the electronic device of the waiter 302 in item 304. The reservation may contain detailed information on the customer 301 and further rich details, such as a number of customers (guests), details on individual customers (guests), ordered dishes and the like. All data and information directed at the reservation may be maintained on a server device or a service provider device. The customer 301 may review and update the reservation as indicated in item 305. The notification of the updated reservation will be received by the waiter 301 in item 306 or another member of staff of the restaurant. Accordingly, the restaurant may be notified about reservations in real time.

A smartphone or another electronic device of the customer 301 may further provide its current geolocation to the server device in order to allow for an automatic estimation of the time of arrival (ETA). The ETA mode may be triggered manually or automatically as indicated in item 307. In the manual mode, the customer 301 may start the auto-ETA mode by interacting with a smartphone. In the automatic mode, the ETA calculation may be started when the customer 301 is within a certain distance from the restaurant or within a time range specified by the reservation, such as X minutes before the reservation.

As indicated in item 308, the smartphone or electronic device of the customer 301 may transmit, push, or otherwise provide a geolocation of the smartphone, which may result in an update of the ETA calculation, which information may be transmitted to the waiter 302 or another staff of the restaurant in step 309.

The processing may continue as shown in FIG. 3B. After receiving the updated ETA notification in item 309, the waiter 302 may be actively notified by his smartphone or electronic device about the customer's arrival. Hence, the waiter 302 may make a proper welcome, locate seating for the customer, and the like. Thereafter or concurrently, the customer 302 may place an order, as indicated in item 310. The waiter 302 may confirm the order and the customer 301 may be provided with a summary of the order according to one or more embodiments of the present disclosure. The waiter 302 may review the order and may decide whether further staff of the restaurant is required to process the order, such as a kitchen 311 of the restaurant. If further staff of the restaurant is needed, the waiter 302 may automatically place the order of customer 301 by transmitting respective information to the kitchen 311, as indicated in item 312. The kitchen 311 may process the order and notify the waiter 302 when the order is ready. Thereafter, the waiter 302 may serve the order to the customer 301, in item 313. It is to be understood that the processing in item 312 may be synchronized with the processing in item 308 such that the waiter 302 may place the order, however, the order may be marked as ready for processing by the kitchen 311 based on the estimated time of arrival of the customer 301. Furthermore, the waiter 302 may be required to confirm that the customer 301 has arrived at the restaurant.

The customer 301 may trigger a payment process using the smartphone or electronic device automatically or manually in item 314. Furthermore, the customer 301 may select options of the payment process. For example, the customer 301 may be a host of a restaurant party and may decide to pay the whole bill on behalf of their guests, or the bills of certain guests, or for individuals to pay their own bills.

As shown in FIG. 3C, the payment may be triggered in item 315. Responsive to the trigger, the summary of the order may be provided to the customer 301, wherein the summary may include the billing information according to the chosen options. The customer 301 may decide whether to pay with a profile, which may be either registered with the restaurant or with another central entity, such as a trusted third party, in item 316. If the customer 301 decides not to pay with a registered profile, the waiter 302 may interact with the customer 301 in order to proceed with payment using various payment instruments, in item 318. However, if the customer 301 decides to pay with a registered profile in item 316, the processing may continue with item 320. In this case, the payment and/or billing may be performed automatically based on information stored in or registered with the profile, such as one or more payment instruments and/or pre-set options, such that the payment gateway (not shown) may directly bill the customer based on the registered profile. In an optional step 320, the customer 301 may be asked by the smartphone or electronic device of the customer 301 to select a tip and the processing may end in item 321. Based on the billing and payment processing shown in FIG. 3C, the restaurant may have real-time access to cash boxes, daily reports, tips and the like.

While FIGS. 3A to 3C show individual entities, such as customer 301, waiter 302, and kitchen 311 of a restaurant, it is to be understood that the present disclosure is not limited to ordering and billing in restaurants only. Rather, the customer 301, the waiter 302 and the kitchen 311 are to be understood as stakeholders, which need not correspond to real persons, but may reflect virtual entities, such as virtual customers and virtual staff of a virtual provider of goods or services in a social network or a gaming environment. Accordingly, the entities may be simulated or represented by modules of electronic devices in order to perform their respective functionality.

Embodiments of the present disclosure are applicable in one or more of the following use cases.

Using an application installed on a customer entity device that is automatically coupled to a communication network of a service provider according to one or more embodiments of the present disclosure, customers/users may discover dishes recommended to them by the service provider. The recommendations may be based on their likes, known allergies, etc. Restaurants, which may be service providers according to one or more embodiments of the present disclosure, could be filtered by category, price and/or by automatic/manual geolocation selection, i.e., for restaurants within a certain area. Making service reservations is revolutionized and upgraded in comparison with previously known service reservation methods, allowing accurate reservations to be made from smart devices of customers/users, and also further allowing the customers/users to invite additional customers/guests and enabling all customers/guests to select their dishes and drinks ahead of time. In this use case, it may also be allowed to formulate seating plans and make preliminary bill information available to all customers/guests via the application and the smart devices of the customers/guests.

On route to the service provider or restaurant, the user/customer may receive GPS route (navigation) directions and an estimated time of arrival (ETA) to a location of the service provider/the restaurant. Once the customer arrives at the location of the service provider (in the restaurant) the customers could be able to connect their smart devices to a communication network of the service provider, for example to WLAN service of the restaurant using the client application installed on the smart devices of the customers. The service provider (the restaurant) receives information related to the service reservation, which is made available to wait staff and kitchen staff and restaurant management through smart devices or via terminals. The terminals may be placed within strategic locations around the restaurant or at the location of the service provider. In any case, restaurant staff operating respective devices may be continuously updated about reservations made, numbers of customers/guests attending, seating plans, orders made and customers' ETA. This may also allow the waiting staff to accurately know who was expected and when, order requirements and dishes ready for collection from the kitchen. Restaurant management are better able to manage the restaurant's profile, menus, daily offers, ordering, staff accounts and obtain accurate statistics, reports, etc., regarding the running of the restaurant.

Potential customers, wait staff and restaurant management are enabled to enhance their experience using the features described below.

A customer may be enabled to discover dishes served in the restaurant by pictures which are recommended by a networked system based on one or more of:
  geolocation of the customer entity device,
  geolocation of the customer entity device manually given by the customer,
  taste preferences of the customer, and/or
  allergies of the customer.

Dishes may also be filtered by categories, a price range and the like, and/or may also be found by text search.

Guests may also be added or additional customer entities may be assigned. A notification is not sent to the additional customers/guests at this point, but is sent later at the reservation phase.

A reservation of the service may include the following. Customer may be enabled to (before reservation date and time is made) make a service reservation, wherein a continuous reservation process is transparently started in the background when a first dish is placed into a cart via the application, and may also add table seating.

A customer may be further enabled to (after reservation date and time is made) make a service reservation, and invite additional customers/guests. A notification to added/assigned additional customers/guests may be sent at this stage.

Both the customer and each additional customer/guest may be entitled to discover and add dishes to a cart in a selected restaurant via the application; update table seating; get continuously, automatically updated cart and preliminary bill information; get navigation directions to restaurant and an ETA at the location of the service provider (the restaurant), in any combination.

Each additional customer/guest may further be enabled to receive notifications about invitations by email, mobile application push notifications, and the like. The guest may also proceed with a reservation (confirm reservation receipt, amend service reservation at the part related to this additional customer/guest), for example, on a website, using a mobile application, and the like.

Wait staff, kitchen staff and a manager of the restaurant may be enabled to be continuously notified about new reservations, reservation updates, number of additional customers/guests, additional customer/guest details, seating order, dish orders, and/or ETA of each customer, in any combination.

On route to and upon arrival at the location of the service provider (the restaurant), the customer is enabled to see and share continuously auto adjusted ETAs and/or navigation directions. A waiter may be enabled to be notified about upcoming reservations, get continuously, automatically adjusted ETAs of arriving customers, be notified about customers' arrival, which allows him to make a proper welcome for customers, and the like. Kitchen staff may be enabled to be notified about upcoming reservations.

The networked system may provide for continuous auto adjustment of the ETA by pulling the geolocation of the customer entity device when a certain condition is met: the customer entity device is X meters away from the service provider/restaurant and/or it is X minutes before reservation time.

In the restaurant, a customer may be entitled to get internet connectivity on the customer's mobile device by connecting to a WLAN of the restaurant using: a public password, a mobile application and the like; receive access to restaurant profile/menu page on Authority App website which is opened on connect; make additional orders; observe continuously, automatically updated bill split by person; unobtrusively pay through the application, for example by using an autopay function when leaving the restaurant; and/or give tips to a waiter, in any combination. The application also enables the host customer to pay for all customers and provides personalized bills to all the customers.

A waiter may be enabled to notify the kitchen about new orders; reorder a kitchen orders queue; be notified about orders ready at the kitchen, or additional orders made by customers. Kitchen staff may be enabled to be notified about new orders in the queue, and queue reordering; and may notify the waiter when an order is ready.

In a restaurant office, a manager may maintain a restaurant (s) profile, menu, daily offers, staff accounts, etc.; get reports, statistics, etc.; register a Wi-Fi network being a communication network of the restaurant and set a password on a Wi-Fi router to provide internet services for customers.

Embodiments of the present disclosure provide for effective services management such as service reservation based on dynamical interaction between electronic devices of customers and restaurant staff, such as via an app of a smartphone. This enables a dynamic customer experience.

The techniques described herein may be implemented in various computing systems, examples of which are described in greater detail above. Such systems generally involve the use of suitably-configured computing devices implementing a number of modules, each providing one or more operations needed to complete execution of such techniques. Each module may be implemented in its own way. As used herein, a module is a structural component of a system which performs an operational flow. A module may comprise computer-executable instructions, and may be encoded on a computer storage medium. Modules may be executed in parallel or serially, as appropriate, and may pass information between one another using a shared memory on the computer on which they are executed, using a message passing protocol or in any other suitable way. Furthermore, modules may be implemented as dedicated hardware or a combination of software and hardware in any combination.

While some embodiments have been described in detail, it is to be understood that the aspects of the present disclosure can take many forms. In particular, the claimed subject matter may be practiced or implemented differently from the examples described and the described features and characteristics may be practiced or implemented in any combination. The embodiments shown herein are intended to illustrate rather than to limit the invention as defined by the claims.

The invention claimed is:

1. A computer-implemented method for managing services, comprising:
    transmitting, for a first computing device, a first notification of a service to a service provider;
    transmitting a first current location request to the first computing device;
    receiving a current location of the first computing device;
    determining an estimated time of arrival of the first computing device based on the current location of the first computing device;
    providing the estimated time of arrival of the first computing device to the service provider;
    monitoring changes in the estimated time of arrival of the first computing device to determine a distance between the current location of the first computing device and a location of the service provider;
    notifying the service provider of an arrival of the first computing device at the location of the service provider based on the current location of the first computing device and the location of the service provider, and
    upon arrival at the location of the service provider, automatically coupling the first computing device to a communications network of the service provider, which comprises automatically setting up a wireless local area network of the service provider based on a service reservation and the estimated time of arrival of the first computing device.

2. The method of claim 1, further comprising continuously requesting the current location of the first computing device.

3. The method of claim 2, wherein the continuously requesting the current location of the first computing device is triggered manually by the service provider or the first computing device.

4. The method of claim 2, wherein the continuously requesting the current location of the first computing device is triggered automatically in response to determining the first computing device is at a predetermined distance away from the location of the service provider or a predetermined time is left before a service reservation time.

5. The method of claim 1, wherein the current location request is transmitted to the first computing device at predetermined time intervals.

6. The method of claim 2, wherein the continuously requesting the current location of the first computing device comprises polling of the first computing device.

7. The method of claim 1, wherein the service provider is notified of the arrival of the first computing device at the location of the service provider when the distance between the current location of the first computing device and the location of the service provider is less than a predetermined threshold.

8. The method of claim 1, further comprising:
    coupling the first computing device to the wireless local area network of the service provider; and
    performing a data exchange between the first customer computing device and the service provider.

9. The method of claim 1, wherein the service comprises a service reservation, and
    wherein the method further comprises adjusting the service reservation based on information received from the first computing device, the information including at least one of preferences, state of health, previous reservations, or current geolocation.

10. The method of claim 1, further comprising:
    transmitting a second notification of the service to the service provider from a second computing device;
    transmitting a second current location request to the second computing device;
    receiving a current location of the second computing device;
    determining an estimated time of arrival of the second computing device based on the current location of the second computing device;
    providing the estimated time of arrival of the second computing device to the service provider; and
    providing the first computing device with the estimated time of arrival of the first or second computing device at the location of the service provider.

11. The method of claim 1, further comprising determining an estimated times of arrival of a plurality of additional computing devices based on the current locations of the plurality of additional computing devices.

12. The method of claim 1, further comprising performing a payment process in response to a request of at least one of first computing device or a second computing device.

13. The method of claim 1, further comprising providing bill information to the first computing device.

14. A system for executing service management, comprising:
    one or more computer readable media storing instructions for executing service management; and
    one or more processors configured to execute the instructions to perform operations comprising:
    transmitting, for a first computing device, a first notification of a service to a service provider;
    transmitting a first current location request to the first computing device;
    receiving a current location of the first computing device;
    determining an estimated time of arrival of the first computing device based on the current location of the first computing device;
    providing the estimated time of arrival of the first computing device to the service provider;
    monitoring changes in the estimated time of arrival of the first computing device to determine a distance between the current location of the first computing device and a location of the service provider;
    notifying the service provider of an arrival of the first computing device at the location of the service provider based on the current location of the first computing device and the location of the service provider; and upon arrival at the location of the service provider, automatically coupling the first computing device to a communications network of the service provider, which comprises automatically setting up a wireless local area network of the service provider based on a service reservation and the estimated time of arrival of the first computing device.

15. The system of claim 14, the operations further comprising:
coupling the first computing device to the wireless local area network of the service provider; and
performing a data exchange between the first customer computing device and the service provider.

16. The system of claim 14, wherein the service comprises a service reservation, and
wherein the operations further comprise adjusting the service reservation based on information received from the first computing device, the information including at least one of preferences, state of health, previous reservations, or current geolocation.

17. The system of claim 14, the operations further comprising:
transmitting a second notification of the service to the service provider from a second computing device;
transmitting a second current location request to the second computing device;
receiving a current location of the second computing device;
determining an estimated time of arrival of the second computing device based on the current location of the second computing device;
providing the estimated time of arrival of the second computing device to the service provider; and
providing the first computing device with the estimated time of arrival of the first or second computing device at the location of the service provider.

18. A non-transitory computer-readable medium storing instructions for executing service management, the instructions, when executed by one or more processors, causing the one or more processors to perform operations comprising:
transmitting, for a first computing device, a first notification of a service to a service provider;
transmitting a first current location request to the first computing device;
receiving a current location of the first computing device;
determining an estimated time of arrival of the first computing device based on the current location of the first computing device;
providing the estimated time of arrival of the first computing device to the service provider;
monitoring changes in the estimated time of arrival of the first computing device to determine a distance between the current location of the first computing device and a location of the service provider;
notifying the service provider of an arrival of the first computing device at the location of the service provider based on the current location of the first computing device and the location of the service provider; and
upon arrival at the location of the service provider, automatically coupling the first computing device to a communications network of the service provider, which comprises automatically setting up a wireless local area network of the service provider based on a service reservation and the estimated time of arrival of the first computing device.

\* \* \* \* \*